United States Patent [19]

Itsuki et al.

[11] Patent Number: 5,212,768
[45] Date of Patent: May 18, 1993

[54] METHOD AND APPARATUS FOR PROCESSING KNOWLEDGE

[75] Inventors: Rei Itsuki, Nishinomiya; Hiroshi Yajima, Amagasaki; Shoichi Masui, Kawasaki; Kikuo Yoshimura, Tokyo; Hiroko Tanabe, Osaka, all of Japan

[73] Assignee: Hitachi, Ltd., Tokyo, Japan

[21] Appl. No.: 588,087

[22] Filed: Sep. 25, 1990

[30] Foreign Application Priority Data

Sep. 29, 1989 [JP] Japan .................................. 1-251888

[51] Int. Cl.⁵ .......................................... G06F 15/18
[52] U.S. Cl. ..................................... 395/54; 395/60; 364/DIG. 2
[58] Field of Search ...................... 395/54, 60, 51, 52; 364/470, 900

[56] References Cited

U.S. PATENT DOCUMENTS

| | | | |
|---|---|---|---|
| 4,658,370 | 4/1987 | Erman et al. | 395/54 |
| 4,700,317 | 10/1987 | Watanabe et al. | 395/51 |
| 4,704,695 | 11/1987 | Kimura et al. | 395/54 |
| 4,809,219 | 2/1989 | Ashford et al. | 364/900 |
| 4,847,784 | 7/1989 | Clancey | 395/54 |
| 4,926,344 | 5/1990 | Collins et al. | 364/470 |
| 4,935,876 | 6/1990 | Hanatsuka | 395/51 |
| 4,939,680 | 7/1990 | Yoshida | 395/60 |
| 4,965,743 | 10/1990 | Malin et al. | 395/60 |
| 4,970,657 | 11/1990 | Wolf | 395/54 |
| 4,970,658 | 11/1990 | Durbin et al. | 395/54 |
| 4,999,833 | 3/1991 | Lee | 395/51 |
| 5,043,914 | 8/1991 | Nihiyama et al. | 395/51 |
| 5,043,915 | 8/1991 | Suwa et al. | 395/51 |

OTHER PUBLICATIONS

Ishida, "Production System and Parallel Processing", The Journal of Information Processing Society of Japan, vol. 26, No. 3, published 1985, pp. 213-216. (No English translation).

Charles L. Forgy, "Rete: A Fast Algorithm for the Many Pattern/Many Object Pattern Match Problem", Artificial Intelligence, vol. 19, published 1982, pp. 17-37. (Provided in English).

"Expert System Buiding Tool for Process Control: Mark II", Takenaka et al, May 25-27, 1988 IEEE.

"The Nature and Evaluation of Commercial Expert System Building Tools" Gevarter et al, Computer, May 1987.

"The Knowledge-Based Expert System: A Tutorial", Roth et al, Sep. 1984 IEEE.

"Classifying the Knowledge into Two Types", Nikkei Computer, Feb. 27, 1989, pp. 83-84. (English translation unavailable).

Rei Itsuki, et al., "Processing Method for High Speed Scheduling by Dividing Knowledge Base", The 39th National Conference of Information Processing Society of Japan, 1989, pp. 149-150. (English translation unavailabe).

Primary Examiner—Allen R. MacDonald
Assistant Examiner—George Davis
Attorney, Agent, or Firm—Fay, Sharpe, Beall, Fagan, Minnich & McKee

[57] ABSTRACT

A method and apparatus for processing a knowledge which divides a knowledge base into at least two knowledge portions, that is, rule groups so as to permit the rule groups to be processed independently of one another, and selects, as a portion to be processed, only a corresponding divided knowledge portion based on characteristics of knowledge required for a knowledge processing in a scheduling problem which includes a large number of planning data to be processed and a plurality of restricting conditions, thereby enabling a highly efficient and high speed scheduling.

1 Claim, 14 Drawing Sheets

FIG. 8

(RULE 2 - 3    ⟵700

IF ( FRAME  A

SLOT A = 'CONDITION X' AND

SLOT B = 'CONDITION Y' )

THEN    ⟵800

(RULE FILE PLUS ('RULE FILE 3'))

(RULE 3 - 2 · EXCLUSIVE-RULE {RULE 2 - 2}
      710        820        830

IF ( FRAME  B

SLOT C = 'NG'

THEN    ⟵840

(RULE-FILE-DELETE ('RULE FILE 1'))

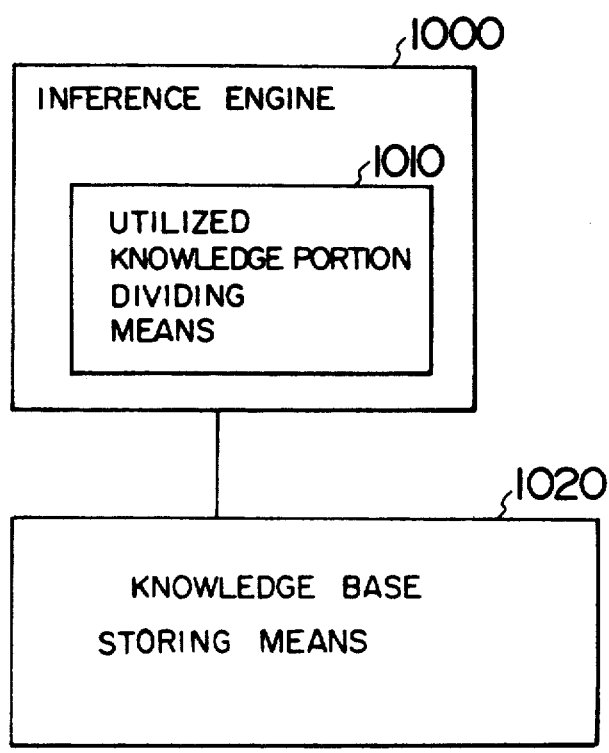

FIG. 12

```
      ╱230
    ╱
A : KNOWLEDGE PORTION
            ╱1200
          ╱
(RULE A - 1
    IF ? CLASS OF PLANNING DATA IS PLANNING DATA, AND
        CARRY-OUT APPOINTED
    THEN SET (ASSIGNED CANDIDATE ON) )
            ╱1210
          ╱
(RULE A - 2
    IF ? CLASS OF PLANNING DATA IS PLANNING DATA, AND
        ASSIGNMENT CANDIDATE IS O N, AND
        PRODUCTION ACCOMMODATING AMOUNT IS MAXIMUM.
    THEN ? PLANNING DATA (ASSIGNMENT)
        DELETE (? PLANNING DATA) )
```

FIG. 13

```
      ╱230
    ╱
B : KNOWLEDGE PORTION
            ╱1300
          ╱
(RULE B - 1
    IF ? CLASS OF PLANNING DATA IS PLANNING DATA, AND
        APPOINTED DELIVERY DATE IS TODAY
    THEN SET (ASSIGNMENT CANDIDATE) )
            ╱1210
          ╱
(RULE B - 2
    IF ? CLASS OF PLANNING DATA IS PLANNING DATA, AND
        ASSIGNMENT CANDIDATE IS O N, AND
        PRODUCTION ACCOMMODATING AMOUNT IS MAXIMUM.
    THEN ? PLANNING DATA (ASSIGNMENT)
        DELETE (? PLANNING DATA) )
```

FIG. 14

```
              ┌1400
PLANNING DATA :
                    ┌1410
        ( PLANNING DATA — 1
             CLASS PLANNING DATA
             CARRY-OUT APPOINTMENT NO
             ASSIGNMENT CANDIDATE OFF
             PRODUCTION ACCOMMODATING AMOUNT 10 )
                    ┌1420
        ( PLANNING DATA — 2
             CLASS PLANNING DATA
             CARRY-OUT APPOINTMENT NO
             ASSIGNMENT CANDIDATE OFF
             PRODUCTION ACCOMMODATING AMOUNT 12 )
                    ┌1430
        ( PLANNING DATA — 3
             CLASS PLANNING DATA        ┌1432
             CARRY-OUT APPOINTMENT YES
             ASSIGNMENT CANDIDATE OFF〜1434
             PRODUCTION ACCOMMODATING AMOUNT 20 )
                    ┌1440
        ( PLANNING DATA — 4
             CLASS PLANNING DATA
             CARRY-OUT APPOINTMENT NO
             ASSIGNMENT CANDIDATE OFF
             PRODUCTION ACCOMMODATING AMOUNT 16 )
                    ┌1450
        ( PLANNING DATA — 5
             CLASS PLANNING DATA
             CARRY-OUT APPOINTMENT YES
             ASSIGNMENT CANDIDATE OFF〜1434
             PRODUCTION ACCOMMODATING AMOUNT 18 )
```

FIG. 15

```
RULE FILE-1 :
 [KNOWLEDGE PORTION A] ─1500
 {RULE GROUP A}
     (RULE A-1 ─1510
         IF ?  CLASS OF PLANNING DATA IS PLANNING DATA, AND
                ADAPTED MACHINE IS MACHINE 1
         THEN SET (ASSIGNMENT CONDITION MACHINE 1)
              EVENT RESET(ASSIGNMENT START) )

(RULE A-2
         IF ?  CLASS OF PLANNING DATA IS PLANNING DATA, AND
                ADAPTED MACHINE IS MACHINE 2
         THEN SET (ASSIGNMENT CONDITION MACHINE 2)
              EVENT RESET(ASSIGNMENT START) )

[KNOWLEDGE PORTION B] ─1520
 {RULE GROUP B}
     (RULE B-1 ─1530
         IF ···
         THEN ··· )A
     ···

METARULE FILE :
     (METARULE - 1 ─1540
         IF START
         THEN RULE GROUP {INITIAL PROCESSING}
              RULE GROUP {RULE GROUP A}
     (METARULE - 2 ─1550
         IF ASSIGNMENT START ─1560              ─1570
         THEN RULE GROUP {RULE GROUP B} )
```

FIG. 16

METARULE FILE
    (METARULE - 1 ⟋1600
        IF START
        THEN RULE GROUP {INITIAL PROCESSING} ⟋1610
            RULE GROUP {RULE GROUP A}
        . . .

RULE FILE 1 ⟋410:
  {INITIAL PROCESSING}
    (INITIAL PROCESSING RULE ⟋1620
      IF CONDITION OF CONTROL FRAME IS START
      THEN DISPLAY (INITIAL DISPLAY) ⟋1630
          RENEWAL-STOP (ROLE GROUP A) ⟋1635
          READ-TABLE (PLANNING DATA) ⟋1640
          SET (CONDITION, IN COURSE OF PLANNING) ⟋1645
          RENEWAL-START (RULE GROUP A) ⟋1650

RULE FILE 2 ⟋415:
  {RULE GROUP A}
    (RULE A - 1 ⟋1660
      IF ? CLASS OF PLANNING DATA IS PLANNING DATA
         ADAPTED MACHINE IS MACHINE 1
      THEN ASSIGNMENT CONDITION MACHINE 1
         EVENT-RESET (ASSIGNMENT START) )
      . . .

FRAME FILE
        (CONTROL FRAME ⟋1660
            CLASS ⟋1665
            CONDITION START) ⟋1670

METHOD AND APPARATUS FOR PROCESSING KNOWLEDGE

CROSS-REFERENCE TO THE RELATED APPLICATIONS

This application relates to copending application U.S. Ser. No. 489,906 entitled "Method for supporting Knowledge Base Development and Inference System" filed Mar. 7, 1990, assigned to the present assignee, and U.S. Ser. No. 432,915 entitled "Inference System and Method of Building the Same" filed Nov. 7, 1989, assigned to the present assignee and Hitachi Software Engineering Co., Ltd., the contents of which are incorporated herein by reference.

BACKGROUND OF THE INVENTION

This invention relates to a knowledge processing technique, and more particularly, to a method and an apparatus for processing knowledge suitable in use for scheduling planning problems in the manufacturing industry as a main subject, and the engineering field including the distribution industry, and a business field.

A conventional knowledge processing method divides the knowledge into a procedural type knowledge and a declarative type knowledge, as described in "Classifying the Knowledge into Two Types" in Feb. 27, 1989 issue of Nikkei Computer, on Pages 83 to 84.

On the other hand, a conventional expert system, as shown in FIG. 9, permits, as far as a knowledge representation is concerned, rule files in a knowledge base 910 to be divided into a plurality of files such as rule files 920, ..., 930, and described in the knowledge base 910. An inference engine 900 organizes a single integral network 950 for verifying the knowledge from these divided rule files and manages a root 940 for the network 950. When a frame in a frame file 960 is modified by executing a rule, the inference engine 900 verifies the modified frame with the network. In this event, since there is a single network, the modified frame needs to be verified with a network portion other than that to which the executed rule belongs. See, Ishida "Production System and Parallel Processing" the Journal of Information Processing Society of Japan, Vol. 26, No. 3, pp. 213–216 (1985).

The above-mentioned prior art proposes to divide an expert knowledge for lay-out design into two kinds of knowledge, that is, a procedural type knowledge and a declarative type knowledge, however, it does not refer to procedures for utilizing these two kinds of knowledge nor a classifying method for other knowledge, nor a processing system for these knowledge.

With respect to conventional expert system building tools, a rule can be divided into a plurality of rule files and described, as far as the knowledge representation is concerned, to facilitate description and arrangement of knowledge. In diagnosis and consulating fields which have conventionally utilized such a tool, the knowledge does not comprise a large number of data to be retrieved, or the knowledge has a top-down type structure. There have been developed processing systems for tools which can effectively process the knowledge having such contents.

However, assuming that the above-mentioned prior art is applied to a scheduling problem, the processing system contained in the prior art tools does not process the respective divided and described rules independently of one another, so that, if a data is not clearly classified and can be processed by either the procedural type knowledge or the declarative type knowledge, such data is processed twice by different types of knowledge and accordingly the processing cannot be speeded up.

SUMMARY OF THE INVENTION

It is an object of the present invention to provide a method and apparatus for processing knowledge which is capable of improving the processing knowledge which is capable of improving the efficiency in a knowledge processing and performing a scheduling at a higher speed for scheduling problems which include a relatively large amount of planning data to be processed and should be solved by planning in consideration of a plurality of restricting conditions.

It is another object of the present invention to provide a method and apparatus for processing knowledge which is capable of verifying modified knowledge contents with a limited one of a plurality of divided knowledge portions to thereby reduce a processing time.

To achieve the above objects, according to one feature of the present invention, a knowledge base is divided into at least two portions in accordance with contents of knowledge, and only one of divided portions is selected for processing in correspondence to the property of knowledge which may be required to solve a scheduling planning problem. Also, a file for preserving modified knowledge is provided in the knowledge base for preserving modifications or changes given to a knowledge portion with a proceeding of an inference. The changes includes such as a frame value change or a newly issued frame as a result of a rule execution.

Further, in the course of utilizing a knowledge, a knowledge element (rule) belonging to a knowledge portion newly activated for utilization is verified with a modified knowledge preserved in the modified knowledge preserving file.

The knowledge element is provided with a modified time storing section for storing a time at which the knowledge element was modified.

Each knowledge element is adapted to include instructions written therein for adding or deleting a utilized knowledge portion or information on a knowledge element which is in an exclusive relationship with the concerned knowledge element.

A knowledge base is divided into two and described according to use, and the two divided portions are utilized in order.

Also, in the course of utilizing knowledge, a necessary knowledge portion is added in a main memory of a computer, and an unnecessary knowledge portion is erased from the main memory, thereby accessing only requisite knowledge portions for utilizing the knowledge.

A knowledge base in the expert system is divided into at least two portions and described by a user, and an inference engine of a tool operates so as to utilize only one of the divided knowledge portions at a time in a knowledge utilizing procedure.

Each of the divided and described knowledge portions is utilized in a single knowledge base, so that knowledge files will never be dispersed, and therefore trouble in maintaining the knowledge files will not occur.

Even if knowledge elements belonging to different knowledge portions become simultaneously usable, only one of them which belongs to a currently activated portion for utilization is utilized, so that a single piece of data will never be repeatedly processed by a plurality of knowledge elements.

When two divided knowledge portions A, B are utilized in the order of A, B, a processing procedure is executed such that partial data requiring further processing after whole data has been processed by the knowledge portion A is solely processed by the knowledge portion B. This procedure largely decreases the amount of data to be processed by the knowledge B and accordingly improves the processing efficiency.

According to one aspect of this invention, since the knowledge is divided without dividing files, the number of files is reduced. Therefore, even when each knowledge portion contains few knowledge elements, the number of files produced will be suppressed, and accordingly a vast number of files will not be produced, thus avoiding difficulty in managing the files.

The contents of knowledge is divided in each file, which results in easy maintenance of the knowledge, i.e. promptly identifying or detecting portions which require maintenance.

The inference engine operates so as to remove knowledge elements having an exclusive relationship with currently activated knowledge elements from the object of knowledge utilization, referring to information on exclusively related knowledge elements described therein. Such operation of the inference engine provides utilized knowledge portions and unutilized knowledge portions and accordingly produces the same effect as virtually dividing the knowledge.

Since several portions of whole data to be processed are processed by knowledge previously activated, it is possible to improve the efficiency in subsequently performed knowledge processings. In other words, an amount of data to be processed by a subsequently utilized knowledge is decreased, which results in reducing a processing time for processing data by subsequently utilized knowledge which essentially requires a long processing time. The inference engine operates so as to add a knowledge processing system constituted in the course of a knowledge utilization to a main memory of a computer (or erase the same from the main memory) in accordance with contents described as knowledge. Such operation enables the knowledge processing only with a minimal requisite amount of knowledge, which results in reducing the amount of activated knowledge and therefore improving the processing efficiency. Also, the capacity of the main memory, required by the processing of the system in the course of knowledge utilization, can be described.

With respect to a knowledge element, the processing system always operates so as to solely preserve the latest state and the latest update time for the concerned knowledge element, which allows matching of a whole knowledge base by verifying only once with the knowledge portion to which the control has been transferred, even in a case where the control is transferred to another knowledge portion after a knowledge element has been updated plural times.

A verification with a knowledge base is interrupted (updated contents are preserved) and resumed based on knowledge update information described in each knowledge element, which makes it possible to control whether or not a knowledge taken in (or written) to the processing system is verified with knowledge originally existing in the processing system upon reading or writing processed data.

Contents of knowledge modified by utilizing a knowledge element contained in a knowledge portion is preserved until a knowledge element in another knowledge portion is later utilized, according to a preserving method which preserves the latest update time and the latest updated contents when another knowledge element is updated during utilizing a knowledge element. Since the latest state of a modified knowledge element is solely preserved by the above-mentioned method, unnecessary knowledge elements are prevented from being preserved.

When a knowledge portion assigned for utilization is transferred to one portion to another, a destination knowledge portion is verified with changes in the knowledge contents which have occurred during a period in which the destination knowledge is not utilized. This operation is effective in reducing a processing time necessary to match the knowledge.

BRIEF DESCRIPTION OF THE DRAWINGS

FIG. 8 is a listing showing an example of a rule description;

FIG. 10 is a schematic diagrams showing a concept of knowledge processing means;

FIG. 11 is a listing showing an exemplary description of a metarule portion;

FIGS. 12 and 13 are listings respectively showing an exemplary description of a knowledge portion;

FIG. 14 is a listing showing an exemplary description of a frame representing planning data;

FIG. 15 is a listing showing an exemplary description of a rule and a metarule for controlling the rule; and FIG. 16 is a listing showing an exemplary description of knowledge in a rule executing section for specifying a knowledge portion which is used for a verification of a network.

DESCRIPTION OF THE PREFERRED EMBODIMENTS

The embodiments of the present invention will hereinafter be described with reference to FIGS. 1 to 10 in the following cases:

(1) A planning system is built by dividing a planning knowledge in a knowledge base into two portions, that is, a portion in which knowledge processes planning data attaching importance to the priority and the other portion in which importance is attached on determining or assigning a producing order of planning data just after the already assigned order without a time gap.

(2) A specific example of an apparatus for dividing a knowledge base into two portion; and (3) A rule file is divided into three portions, portions necessary to an inference are determined in course of the inference, and a network for a knowledge verification is built only with requisite portions.

Figure 1:
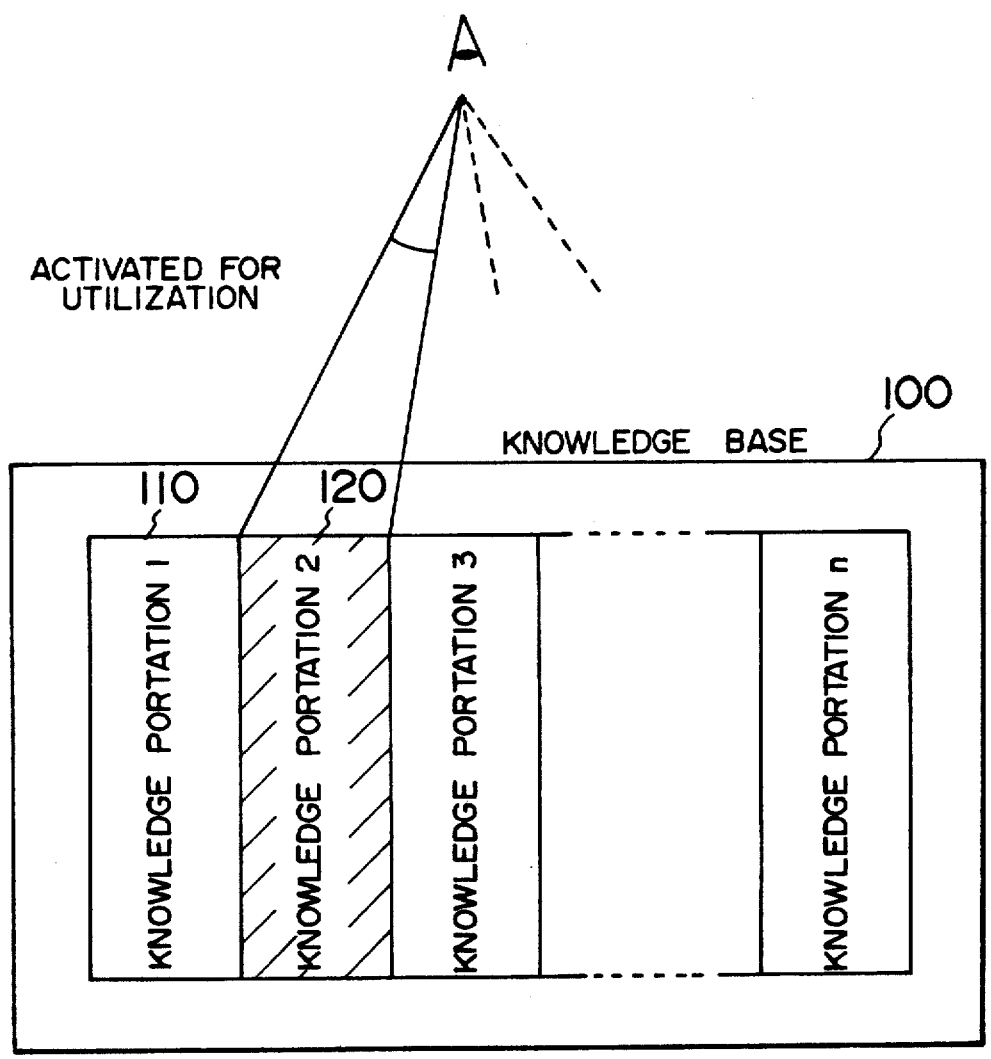
FIG. 1 is a schematic diagram showing that knowledge is divided into a plurality of portions, and a knowledge processing is performed by limiting a utilized range of the knowledge.

First, a knowledge base structure for dividing a knowledge base into two or more portions, that is, rule groups is explained with reference to FIG. 1. FIG. 1 shows that a knowledge base 100 is divided into a plurality of knowledge portions 110, 120, ..., and the knowledge portion 120 is currently selected for utilization. Here, it is assumed that the knowledge base 100 is divided into rule groups by a production system which employs a known condition verifying algorithm as described in "A Fast Algorithm for the Many Pattern/Many Object Pattern Match Problem" by Forgy, C. L. in Artificial Intelligence, Vol. 19, pp 17-37 (1982). A knowledge division processing method is also referred to in a paper presented by the present inventors and others, entitled "Processing Method for High speed Scheduling by Dividing Knowledge Base" published at the 39th National Conference of Information Processing Society of Japan, pp. 149-150 (1989), the contents of which are included herein for reference.

Next, application examples of "a knowledge which processes planning data attaching importance to the priority" will be given below:

EXAMPLE 1

If there is planning data which specifies a time at which products are carried out from a factory, a scheduling is executed for the specific planning data prior to planning data without specific time data.

EXAMPLE 2

A planning data having a specified time at which products are carried out from a factory is assigned to producing machines so as to terminate the production by a time which is calculated by subtracting a time period necessary to prepare the carry-out from the carry-out time.

A knowledge which processes planning data attaching importance to the priority can be regarded as a limited knowledge for processing peculiar data having a specified shipment date.

Next, application examples of "a knowledge in which importance is attached on determining a producing order of planning data so as to terminate the production as early as possible" will be given below:

EXAMPLE 1

If a planning data does not specify a carry-out time at which products are carried out from a factory, products are produced in sequence of earlier appointed delivery date.

EXAMPLE 2

If a planning data does not appoint a carry-out time at which products are carried out from a factory, and if there are a plurality of products which are to be delivered on the same appointed date, the product having the largest production accommodating amount is first produced.

This knowledge which attaches importance on determining a producing order of planning data so as to terminate the production as early as possible can be also regarded as general knowledge for processing ordinary data except for data having a peculiarity of appointing a carry-out date.

Figure 2:
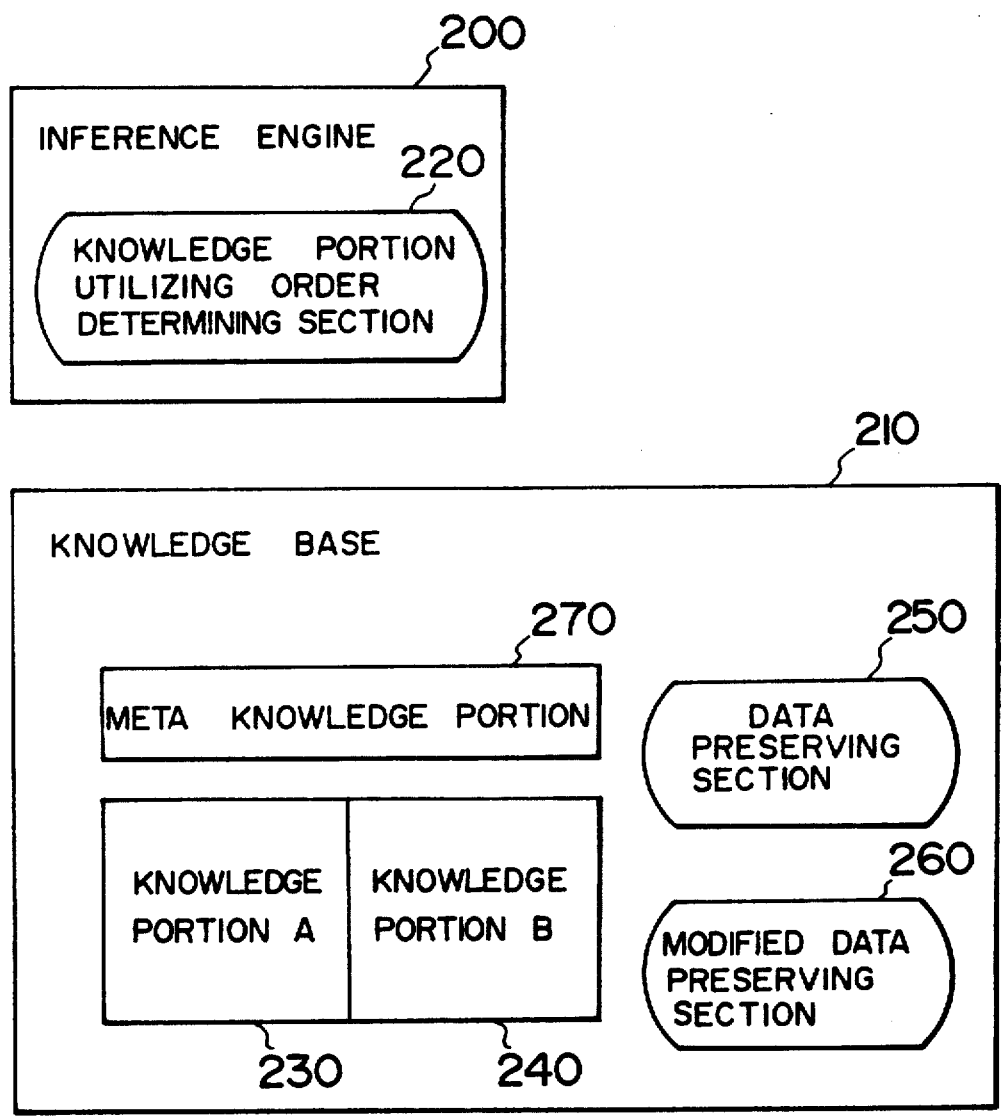
FIG. 2 is a schematic diagram showing that a knowledge is divided into two portions and utilized in due order.
Figure 3:
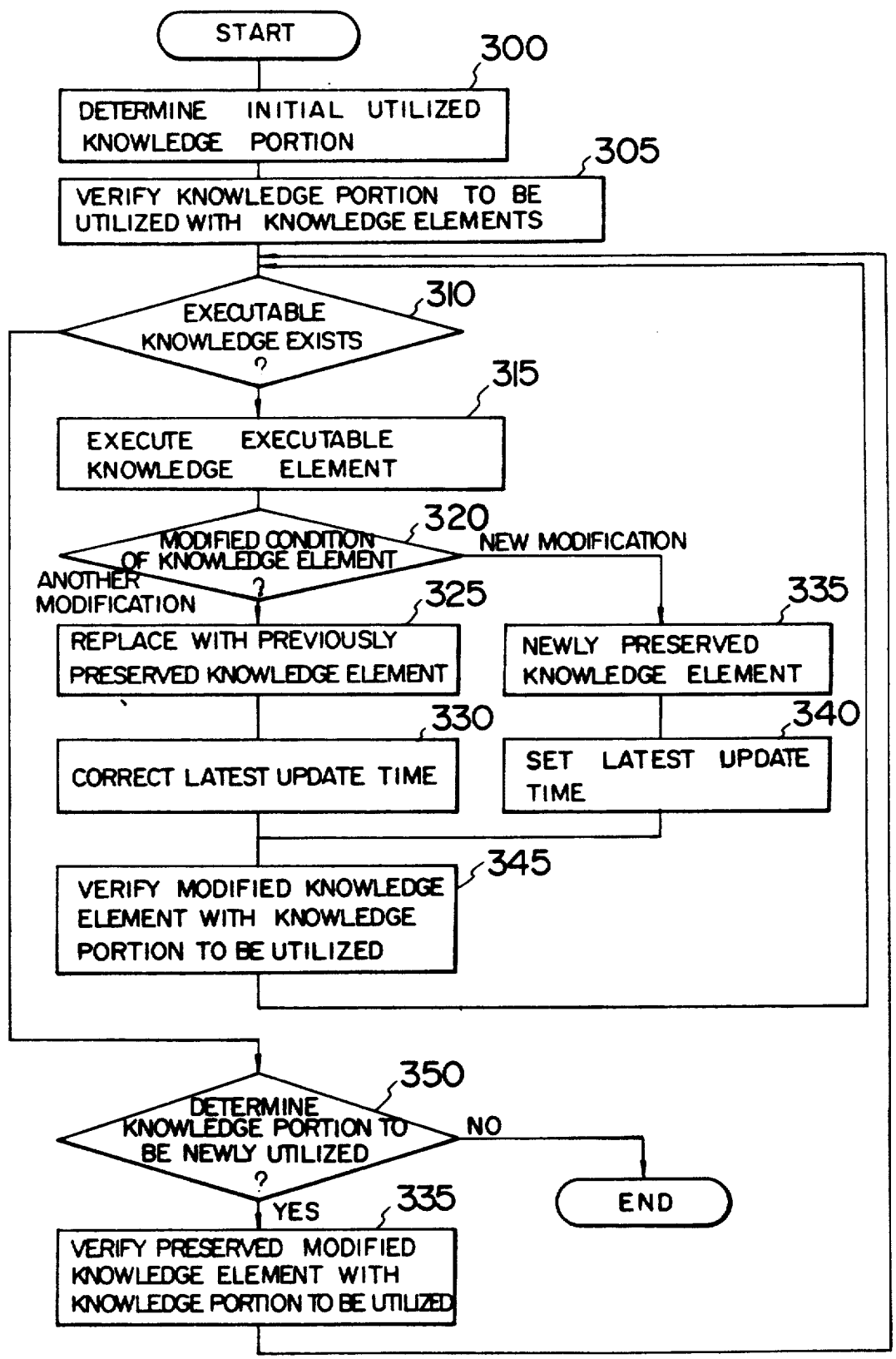
FIG. 3 is a flowchart showing a procedure of processing knowledge divided into a plurality of portions.

Next, a concept of processing means of the present invention will be described with reference to FIGS. 10 and 2. FIG. 10 shows a knowledge processing apparatus according to an embodiment of the present invention, in which inference means 1000 infers based on knowledge representation such as metarules, rules and frames stored in knowledge base storing means 1020. The metarule is expressed by an IF—THEN statement and is provided for determining which rule is to be executed first when a rule group is activated or a plurality of rules are executable. The frame is defined as a knowledge representation which represents a state and structure of an object to be inferred, provides a hierarchical relation among frames and inherits characteristics of higher ranked frames to lower ranked frames. The rule is defined as a knowledge representation describes a hypothesis which can be deduced from a frame or the like, results, operations to be executed, and so on in an IF-THEN type production form. The rules can be classified into rule groups according to experiences and contents of a procedure. Means 1010 for processing and dividing a knowledge portion determines a knowledge portion to be processed from knowledge representation stored in knowledge base storing means 1020 with reference to a metaknowledge portion 270 as will be later explained with reference to FIG. 2. In this embodiment, a knowledge portion A230 is first processed (or activated), and a knowledge portion B240 is subsequently processed (or activated) based on the metaknowledge portion 270. Also, an independent knowledge processing system is built for each knowledge portion. The knowledge base storing means 1020 preserves built knowledge representation.

Next, a system configuration of the present invention will be explained with reference to FIG. 2. A scheduling knowledge in a knowledge base 210 is divided into two knowledge portions A230 and B240. In the knowledge portion A230, there is described knowledge which processes planning data attaching importance to the priority (for example, an appointed date), while the knowledge portion B240 includes knowledge which attaches importance on determining a produing order of planning data so as to terminate the production as early as possible. A metaknowledge portion 270 represents a higher ranked conception of these knowledge portions. An inference engine 200 executes a predetermined function by means of a variety of programs, and specifically has a section 220 for determining an order of utilizing the divided knowledge portions by which the divided knowledge portions are utilized in the order of higher priority described in the metaknowledge portion 270. According to the metaknowledge portion 270, knowledge in the knowledge portion A230 having higher priority which is capable of processing planning data to be processed is first utilized among the knowledge belonging to these knowledge portions A230, B240. Knowledge in the knowledge portion B240 having a lower priority which is capable of processing the planning data to be processed is later utilized. The knowledge portions A230, B240 are independently utilized, and while the knowledge portion A230 is being utilized, the knowledge portion B240 is never utilized. On the contrary, while the knowledge portion B240 is being utilized, the knowledge portion A230 is never utilized. Data used for a planning is stored in data preserving section 250, and such data which has been processed by planning knowledge in the course of utilizing planning knowledge is preserved in a modified data preserving section 260.

Next, the operation of a knowledge processing according to the above-mentioned embodiment of the present invention will be explained with reference to FIGS. 2, 3 and 11 to 14. The inference engine 200 determines the knowledge portions to be utilized in the order of higher priority 1100 with respect to the knowledge portion utilization described in the metaknowledge portion of the knowledge base 210, and sets a network between the utilized knowledge portions as an object of knowledge verification. Thus, the knowledge portions utilized in an initial stage are determined (step 300 in FIG. 3). In this embodiment, the knowledge portion utilizing order determining section 220 determines to first utilize the knowledge which processes planning data attaching importance to the priority contained in the knowledge portion A230, wherein a network of the knowledge portion A230 becomes an object of knowledge verification. When the knowledge portion A230 determined as being utilized in the initial stage has been verified with planning data 1400 (step 305), the inference engine 200 determines whether an executable knowledge element exists in the knowledge portion A230 which is now being utilized (step 310). Referring to a rule shown in FIG. 14, since there exist planning data—31430 and planning data—51450 which have a carry-out appointment column 1432 inscribed with "yes", the inference engine 200 determines that a rule A 11200 (FIG. 12) is executable. By executing the rule A 11200, "ON" is inscribed in an assignment candidate column 1434 of the planning data—31430 and the planning data 51450.

When the results obtained by executing the rule and the planning data have been processed (step 320), information on the planning data, i.e. the data names of the planning data—31430 and the planning data—51450 in this case, are preserved in the modified data preserving section 260 (step 335), and the processed time is set in the planning data as the latest update time (step 340). If previously processed planning data is repeatedly processed (step 315), information on the planning data presently preserved in the modified data preserving section 260 is replaced with newly updated information (step 325), and the current time is set as the latest update time (step 330).

Afterwards, the inference engine 200 verifies the modified planning data, the planning data—31430 and the planning data—51450 with the network of the knowledge portion A230 which is now an object of utilization. Next, the inference engine 200 examines whether or not there is an executable knowledge element (rule). Since the assignment candidate columns of the planning data—31430 and the planning data—51450 have been previously set to "ON", a rule A—21210 (FIG. 12) is to be executed.

When the rule A—21210 has been executed, there is no executable knowledge elements in the knowledge portion A, so that the inference engine 200 determines a knowledge portion which is next assigned to be an object of utilization. Here, the metaknowledge portion 270 assigns, as a new object of utilization, the knowledge described in the knowledge portion B240 having priority next to the knowledge portion A230, that is, knowledge which attaches importance on determining a producing order of planning data so as to terminate the production as early as possible. Therefore, a network of the knowledge portion B240 is employed for knowledge verification. When a knowledge portion assigned for utilization is changed, a modified knowledge element previously preserved in the modified data preserving section 260 is verified with the network of the knowledge portion B240 newly assigned for utilization. Since all modified knowledge portions are verified with networks in the initial stage, it is determined that a rule B—11300 (FIG. 13) becomes executable by planning data—11410, planning data—21420 and planning data 41440. Thus, when there remains no knowledge portion newly assigned for utilization (step 350), specifically, when no knowledge elements which may become an object of utilization exist in the knowledge portion B240, the inference engine terminates the processing.

According to the present embodiment, the following effects can be produced:

(1) It is possible to process in a single knowledge base two different processings, that is, a processing which attaches importance on the priority of processed planning data and a processing which attaches importance on determining a producing order of planning data so as to terminate the production as early as possible.

(2) In the processing which attaches importance on the priority of processed planning data, planning data having a higher priority is solely assigned for utilization, and accordingly, knowledge verification is performed only in the range of the network of the knowledge portion A, so that a time necessary for the knowledge verification can be reduced.

(3) In the processing which attaches importance on determining a producing order of planning data so as to terminate the production as early as possible, which is subsequently performed after the processing described the above item (2), the assignment processing has been completed for the planning data with higher priority which has the carry-out appointment within all planning data, so that the remaining planning data is solely verified with the network of the knowledge portion B, thereby reducing a time necessary for the knowledge verification.

Next, processing measures for knowledge division according to an embodiment of the present invention will be explained with reference to FIGS. 4, 5, 12, 14 and 15.

Figure 4:
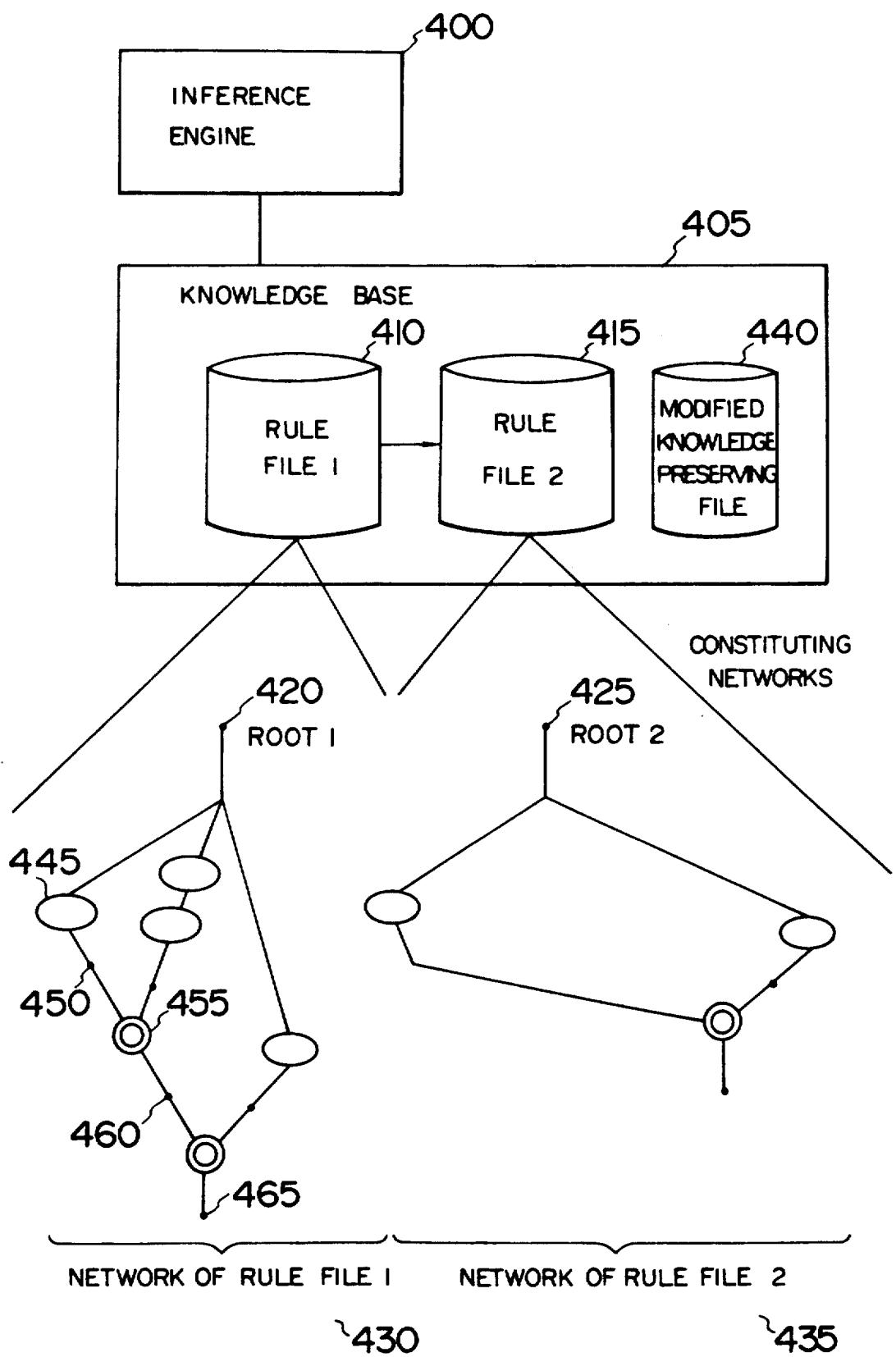
FIG. 4 is a schematic diagram showing that knowledge is divided into two portions by dividing a rule file.

FIG. 4 shows a scheme of dividing a rule by dividing a file in respective rule portions, wherein a knowledge base 405 has rule files 1-410, 2-415 divided and described therein.

FIG. 15 shows a scheme of dividing a rule in a file with a rule portion identifying inscription. A knowledge base 505 may contain a plurality of rule files, however, each rule in the rule files is divided with a rule portion identifying inscription.

The operation of the above-mentioned embodiment will now be explained.

In FIG. 4, the knowledge base 405 is divided into files 1-410, 2-415 in respective rule portions. An inference engine 400 constitutes a network for each of the divided rule files 430, 435, and assigns a rule portion containing an executable rule to an object of update in each network. The network is repeatedly constituted for a number of rule files, and roots 1-420, 2-425 of the network are managed for the number of rule files. Such update includes one which occurs as a result of the collation or verification of network constituted by the rule condition with respect to a change of the frame description.

Now, a method of constituting a network and verifying a knowledge will be explained with reference to a network 430 of a rule file 1 shown in FIG. 4, by way of example. A network includes a rule condition section. When frame information is modified, an attribute value described in the rule condition section of a modified frame is checked at a node "○" (white circle) 445. The frame, after passing this check, is stored in a node "." (a black point, which node may also be a memory capable of holding the frame information after checking) 450 located below the node "○" (white circle) 445. At a node "⊙" (double circle) 455, commonness, exclusiveness and so on are checked between the above plural (two in this example) frame information stored in the node "." (black point) 450. The frame information passing this check is stored in a node "." (black point) 460 located below the node "⊙" (double circle). Finally, a pair, which is formed by the frame passing all the conditions described in the rule condition section and its rule, is stored in a terminal node "." (black point) 465. Giving the rule A__11200 in FIG. 12 and the planning data__31430 in FIG. 14 as examples, the planning data__31430 is checked whether the attributes of "class" and "carry-out appointment" are "planning data" and "yes", respectively. Since the planning data__31430 can pass this attribute check, it is preserved in a node "." (black point) located below the node "○" (white circle). On the other hand, the rule condition section of the rule A__11200 does not have further description, so that this "." (black point) is coincident with a terminal node "." (black point), whereby the information on the rule A__11200 and the planning data__31430 is paired and preserved.

The inference engine 400, when a frame is modified, updates a network of a rule file to which a presently executed rule belongs, and preserves the modified frame in a modified knowledge file 440 in order to supply the updated frame to a network subsequently processed.

Knowledge verification in a network of a knowledge portion newly assigned for utilization, immediately after a knowledge portion to be utilized has been changed, is performed with reference to modification time information (time tag) attached to a frame. Specifically, when a network to be updated is modified, the network is updated by supplying frames modified by an execution of a rule during a period from a time when a network newly assigned for utilization was latest and active, to the current time.

Figure 5:
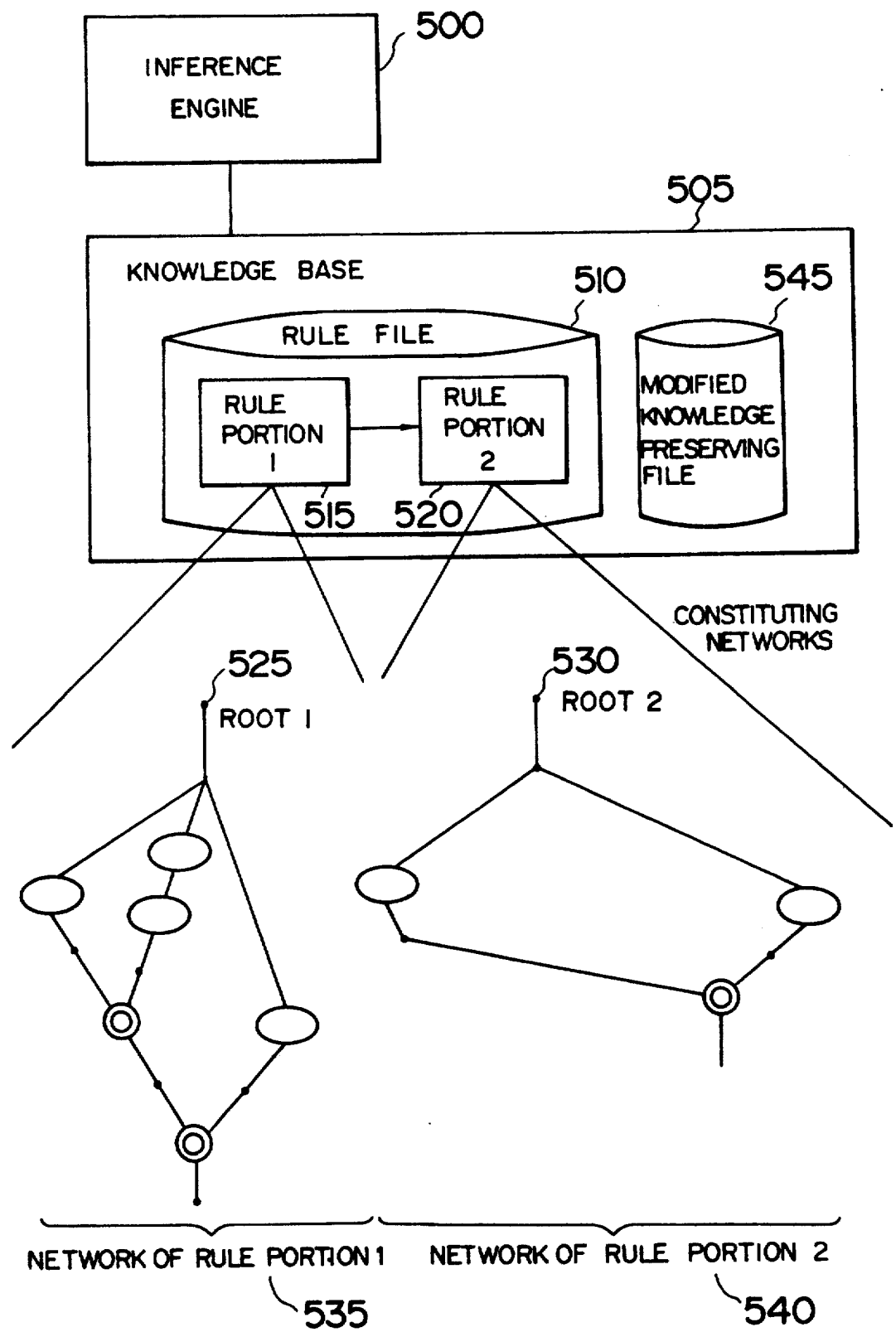
FIG. 5 is a schematic diagram showing that knowledge is divided in a rule file.

In FIG. 5, a rule in a file is divided with a rule portion identifying inscription. A portion to be verified with knowledge of a network is controlled by associating a control, for a rule group to be executed, effected by instructions (event__reset and so on) for modifying a task described in an executing section of a rule, with a rule portion which is used for updating a network.

Specifically, as shown in FIG. 15, a knowledge portion A1500 is now an object of knowledge verification. A rule A__1-1510 is executed to start a task "Assignment start" 1560. By this operation, a rule portion to be executed is a rule group B1570 described in a metarule__21550> Therefore, a knowledge portion B1520 including the rule group B1570 is newly assigned for a knowledge verification. In the listing of FIG. 15, a symbol "[ ]" indicates a rule portion identifying inscription.

The inference engine 500 discriminates an inscription of a rule dividing portion. The inference engine 500 also divides and constitutes networks 535, 540 according to a rule block inscription while reading a rule file 510. The inscriptions of respective rule portions are replaced with respective rule file names for dividing the rule file.

Further, a method of modifying a network to be updated is executed by replacing a processing for dividing a rule file performed for each file with a processing performed for each rule portion inscription.

The method of dividing a knowledge verifying range by dividing a file and the method of dividing a knowledge verifying range by providing a rule portion identifying inscription described in the above embodiment provides the following advantages:

(1) In the first method, each file contains a different knowledge, which results in readily identifying a knowledge upon knowledge maintenance or updating.

(2) In the second method, a plurality of knowledge modules having different contents can be described in a single rule file, so that a number of files can be suppressed even if a rule is divided into a large number, whereby the rule can be readily maintained or updated.

(3) Since knowledge can be divided and processed in a single knowledge base, the knowledge base will not be dispersed, thereby facilitating knowledge maintenance.

Figure 6:
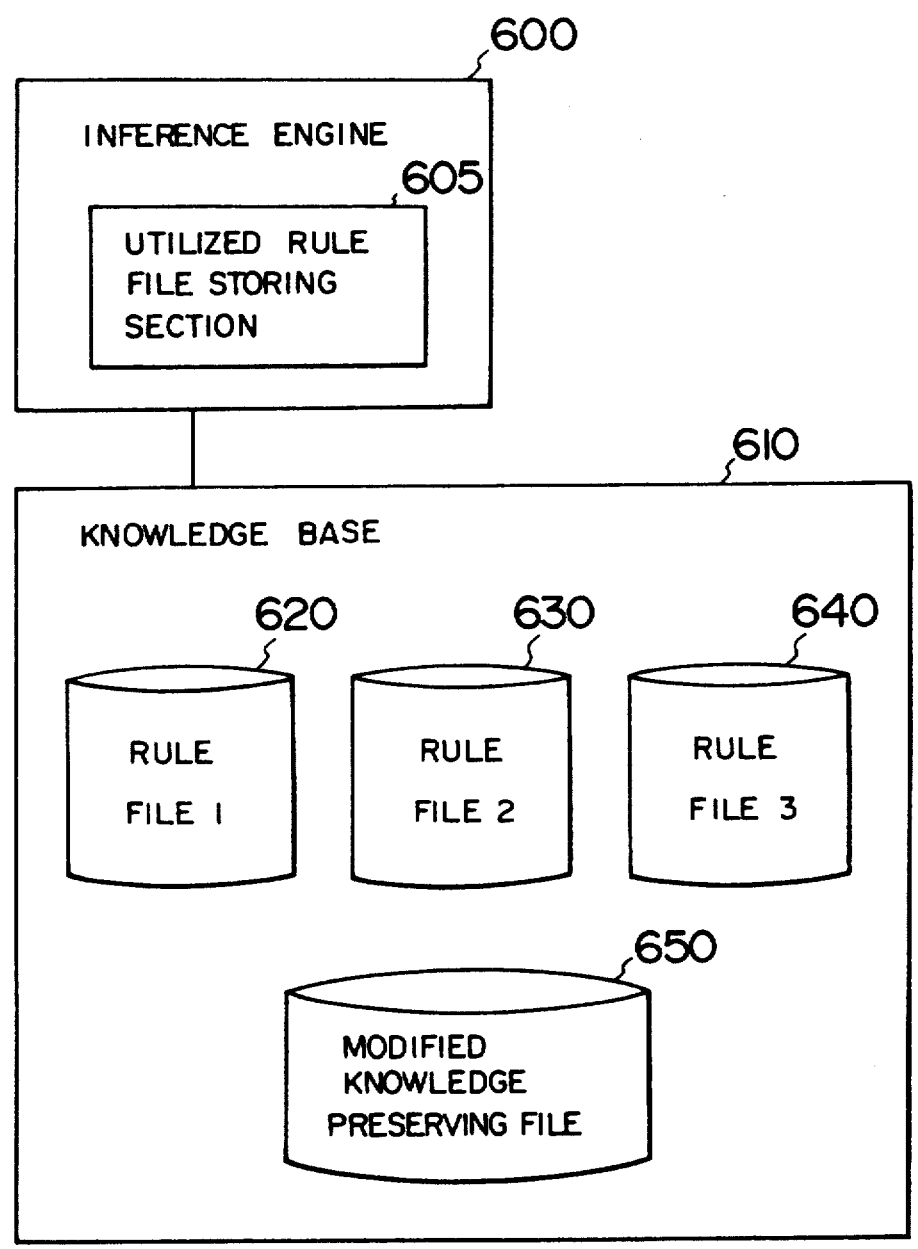
FIG. 6 is a schematic diagram showing that a rule file is divided into three portions for processing knowledge.

FIG. 6 shows a system configuration according to a further embodiment of the present invention. The system of the present embodiment includes an inference engine 600 having a utilized rule file storing section 605 for preserving a time at which a rule file is deleted from the latest utilized rule file, three rule files 1620, 2630 and 3640, and a modified knowledge preserving file 650 for preserving knowledge information which has been modified in course of an inference.

Figure 7:
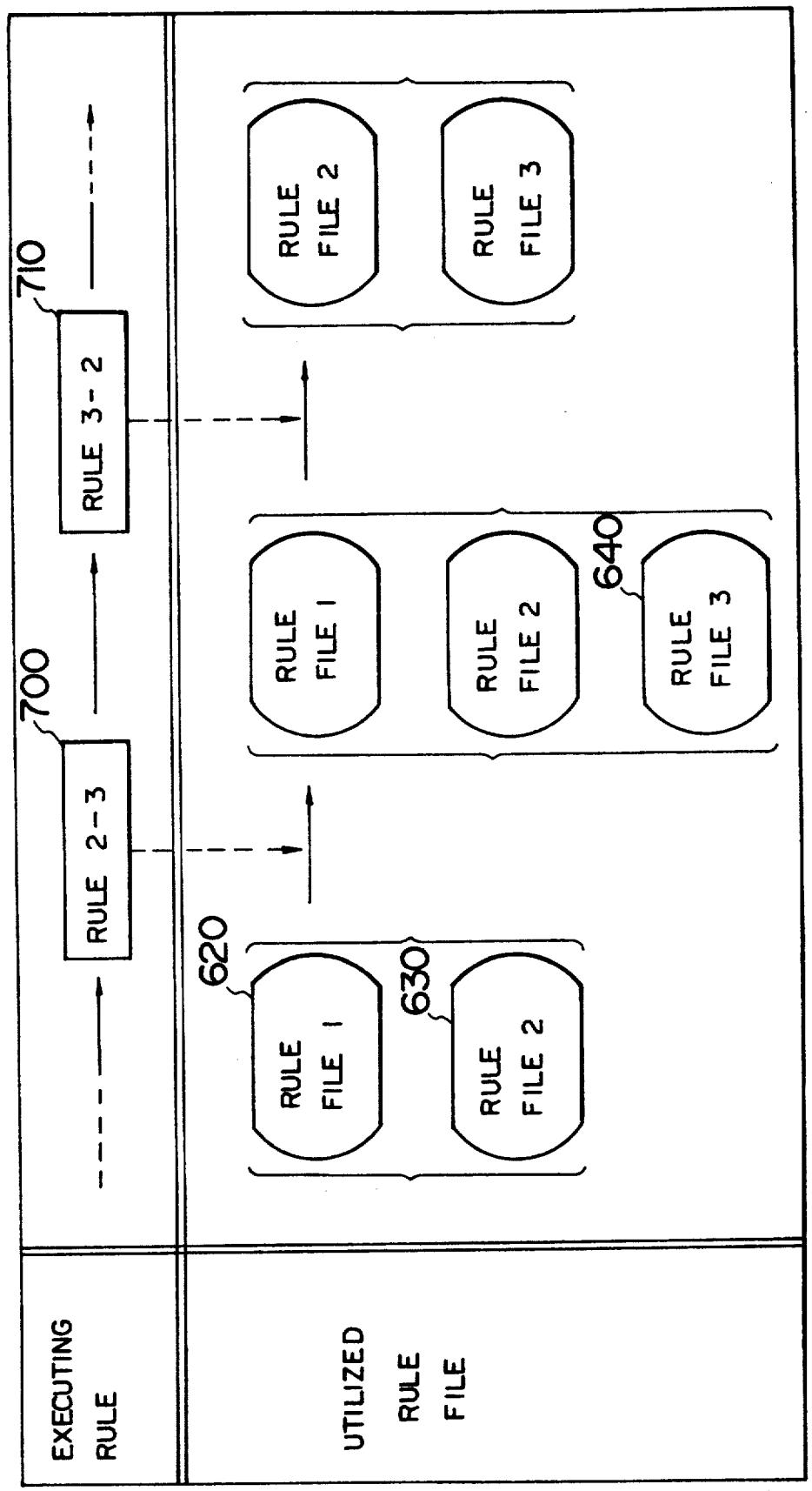
FIG. 7 is a schematic diagram showing executed rules and a transfer among rule files activated by rule executions.
Figure 9:
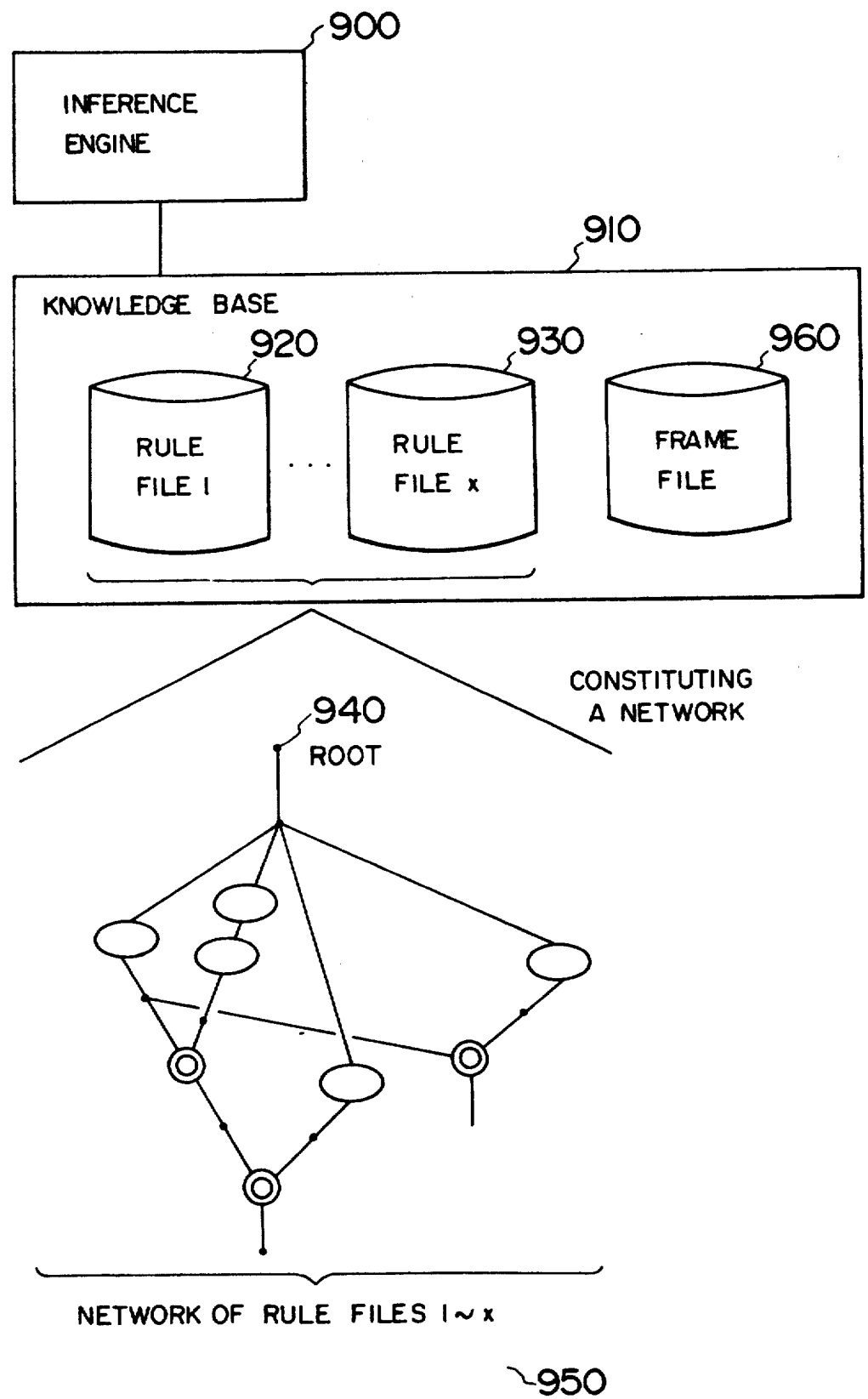
FIG. 9 is a schematic diagram showing a prior art example which performs a knowledge processing without limiting a utilized range of a knowledge.

In FIG. 7, the rule file 3640 is added as a rule file to be utilized at a time when a rule 2__3700 was executed in course of an inference, and the rule file 1620 is deleted from rule files to be utilized at a time a rule 3__2710 was executed.

Further, FIG. 8 shows an example of describing the rule 2__3700 and the rule 3__2710 in a knowledge file.

The operation of the present embodiment will be described with reference to FIGS. 6 to 8.

It is assumed that rule files 1620, 2630 are assigned for utilization in course of an inference. On a main memory of a computer, a network for verifying a knowledge for the rule files 1620, 2630 is constituted. In the rule file 2630, a condition determining rule 2__3700 is described. A utilized rule file addition processing 800, described in an executing section of the condition determining rule 2__3700 is executed to newly set a rule file 3640 in a knowledge verifying range. Then, an inference engine 600 additionally produces a network for the rule file 3640 for knowledge verification on the main memory, and verifies knowledge modified from a time when the latest rule file 3640 was deleted from the utilized rule files to the current time with the network of the rule file 3640.

An inference is advanced, and at a time when the rule 3__2710 described in the rule file 3640 is executed, the network of the rule file 1620 is deleted from the main memory by a utilized rule file deleting instruction 810 described in an executing section of the rule 3__2710, and the utilized rule file storing section 605 preserves therein a time at which the rule file 1620 was deleted from the utilized rule files.

Also, since the rule 3—2710 includes an exclusive rule 820 which describes that the rule 2—2830 is in an exclusive relationship, this rule 2—2830 is deleted from the utilized rule. Setting an exclusive relationship for each rule does not mean deletion of a network related to the rule from the main memory and is performed by managing the root of a network.

The present embodiment can produce the following effects:

(1) It is possible to divide a knowledge according to a plurality of dividing aspects, such as "a knowledge which processes with importance attached on the priority of processed planning data" and "a knowledge which attaches importance on determining a producing order of processed data so as to terminate the production as early as possible" as described in the first embodiment, "a definitive knowledge" and "a business procedural type knowledge", and so on.

The above-mentioned "definitive knowledge" is defined as knowledge which is determined by a thought or a processing at one stage, for example, in a case where a relation between a product and a producing machine is uniformly determined, such as "if a product A is included in planning data, it is assigned to a producing machine A". This knowledge, as is completed by a one-stage processing, can be regarded as quickly processed knowledge. On the other hand, the "business procedural type knowledge" is defined as a knowledge which determines a processing through thoughts or procedures at several stages with respect to the order receiving data, the production accommodation amount, the appointed delivery date and so on, for example, in a case where products can be produced by several kinds of producing machines. When such knowledge is described in a single rule, it is required to investigate planning data with respect to each of an order receiving data, a production accommodation amount, an appointed delivery date and so on before reaching a final processing such as assignment. Thus, the business procedural type knowledge can be regarded as a time consuming knowledge.

(2) Since a utilized rule can be added or deleted during an inference in accordance with intermediate results, a knowledge processing can be always performed only with minimal requisite knowledge portions.

(3) In course of an inference, the main memory of the computer is not loaded with networks related to all rule portions but only portions employed for knowledge verification, which results in decreasing an amount of occupied memory, thereby making it possible to store a large size of knowledge such as the rule in the main memory.

Next, a fourth embodiment of the present invention regarding a knowledge division will be described with reference to FIGS. 4 and 16.

In FIG. 4, a file is divided in every rule portion. A knowledge verifying range of a network indicates a method of determining during executing a rule according to contents described in the rule. In a knowledge base 405, rule files 1410, 2405 are divided and described.

The operation of the fourth embodiment thus constituted will be described with reference to FIGS. 4 and 16.

In FIG. 4, a file is divided in every rule portion. The inference engine 400 constitutes networks 430, 435 for each divided rule file. If there is no specifically assigned network in an executing section of a rule, all networks are to be updated.

When an inference is started, an initial processing event 1610 is issued according to a metarule 11600. In an initial condition, contents of a "condition" slot 1665 of a control frame 1660 is "start" 1670, so that an initial processing rule 1620 is executed. Here, after an initial display is displayed by a display instruction 1630, a renewal—step instruction 12635 interrupts knowledge verification with the network 435 of a rule file 2. With this condition maintained, planning data is read and converted to a planning data frame by a read-table instruction 1640. The generated planning data frame is held in a modified knowledge storing file 440. When all planning data has been read, a setting instruction 1645 sets "in course of planning" in the "condition" slot 1665 of the control frame 1660. When a renewal—start instruction 1650 is subsequently issued, the network 435, which has not been verified with a knowledge, is included in a knowledge verifying range. Then, the planning data frame held in the modified knowledge storing file 440 is verified with the network 435 of the rule file 2.

The fourth embodiment can have the following advantages:

(1) A particular knowledge portion only is removed from a knowledge verifying range.

(2) Since it is possible to assign portions to be verified with knowledge in a rule executing section, knowledge can be verified with knowledge portions which do not include rules to be executed.

What is claimed is:

1. A knowledge processing apparatus comprising:
inference means having means for dividing a knowledge base which includes a plurality of knowledge expressions into at least two knowledge portions in accordance with contents of the knowledge portions and objects to be processed;
constituting means coupled to said inference means for constituting a network of a rule file for condition verification of a rule execution for each divided portion independently of one another;
a knowledge base storing means for storing the knowledge base, the knowledge base storing means being coupled with the inference means and the constituting means;
a selecting means for selecting one of the at least two knowledge portions, corresponding to characteristics of knowledge at a time of a knowledge utilization process;
means for dynamically adding or deleting, during knowledge utilization, processed portions used for a knowledge verification processing among processed portions provided on a memory according to contents described in the knowledge base as knowledge;
means for controlling to determine, during knowledge utilization, whether a change in a knowledge element belonging to a divided knowledge portion caused by utilizing the knowledge element is to be verified with other knowledge portions or such verification with other knowledge portions is deferred and another knowledge element is to be utilized;
modified knowledge holding means for holding a latest update time and a latest update contents when a knowledge element belonging to a divided knowledge portion is updated while the other knowledge element is being utilized;
preserving means for preserving contents of the change in knowledge caused by utilizing the knowledge element in the knowledge portion until a different knowledge element in a different knowledge portion is later utilized.

* * * * *